(12) United States Patent
Cox (10) Patent No.: US 11,852,803 B2
(45) Date of Patent: Dec. 26, 2023

(54) LARGE APERTURE, SINGLE AXIS, REACTIONLESS FAST STEERING MIRROR

(71) Applicant: Raytheon Company, Waltham, MA (US)

(72) Inventor: Christopher A. Cox, Torrance, CA (US)

(73) Assignee: Raytheon Company, Tewksbury, MA (US)

( * ) Notice: Subject to any disclaimer, the term of this patent is extended or adjusted under 35 U.S.C. 154(b) by 388 days.

(21) Appl. No.: 17/083,046

(22) Filed: Oct. 28, 2020

(65) Prior Publication Data

US 2022/0128812 A1   Apr. 28, 2022

(51) Int. Cl.
| | |
|---|---|
| G02B 26/08 | (2006.01) |
| G02B 7/182 | (2021.01) |
| G02B 7/198 | (2021.01) |
| G02B 7/00 | (2021.01) |

(52) U.S. Cl.
CPC ....... *G02B 26/0816* (2013.01); *G02B 7/1821* (2013.01); *G02B 7/198* (2013.01); *G02B 7/001* (2013.01)

(58) Field of Classification Search
CPC .. G02B 26/0816; G02B 7/1821; G02B 7/198; G02B 7/001; G02B 7/192; G02B 26/105; G02B 26/10; G02B 19/0047; G02B 7/00; G02B 26/00
USPC ............... 359/17, 202.1, 217.2, 224.1, 558
See application file for complete search history.

(56) References Cited

U.S. PATENT DOCUMENTS

| | | | |
|---|---|---|---|
| 4,021,716 A | | 5/1977 | Rue |
| 5,283,682 A | * | 2/1994 | Ostaszewski ........ G02B 7/1821 310/22 |
| 5,521,740 A | | 5/1996 | Brosens |
| 6,069,726 A | | 5/2000 | Hughes |
| 6,107,770 A | * | 8/2000 | Jackson ................... B64G 1/28 318/58 |
| 10,197,792 B2 | | 2/2019 | Bullard |
| 2007/0018604 A1 | | 1/2007 | Montesanti et al. |
| 2010/0014140 A1 | * | 1/2010 | Akedo ............... G02B 26/0833 359/199.1 |
| 2014/0268383 A1 | * | 9/2014 | Bullard .................. G02B 7/182 108/1 |

OTHER PUBLICATIONS

International Search Report and Written Opinion of the International Searching Authority dated Dec. 14, 2021 in connection with International Patent Application No. PCT/US2021/050915, 10 pages.

\* cited by examiner

*Primary Examiner* — William Choi
*Assistant Examiner* — Ray Alexander Dean (57) ABSTRACT

A method includes rotating a mirror assembly in a first direction using an actuator. The mirror assembly is rotationally coupled to a base and includes a mirror. A first end of the mirror is rotationally coupled to the base, and a second end of the mirror is not supported by or attached to another structure. The method also includes rotating a reaction inertia assembly in a second direction opposite the first direction using the actuator. The reaction inertia assembly is rotationally coupled to the base. The method further include restricting movement of the mirror assembly and the reaction inertia assembly in multiple degrees of freedom using multiple flexures.

20 Claims, 8 Drawing Sheets

LARGE APERTURE, SINGLE AXIS, REACTIONLESS FAST STEERING MIRROR

TECHNICAL FIELD

This disclosure is directed in general to optical systems. More specifically, this disclosure relates to a large aperture, single axis, reactionless fast steering mirror.

BACKGROUND

Some designs for single axis steering mirrors use a single ball bearing and a cantilever mirror. These designs have high friction and hysteresis and thus provide very limited servo performance. Other designs for flexure-mounted single axis steering mirrors have been proposed that use a flexure on each side of the mirror with one or more mechanisms for diaphragm flexure to release over-constrained degrees of freedom. However, the surface figure error (sometimes referred to as "wavefront error") performance of these designs has been poor.

SUMMARY

This disclosure provides embodiments of a large aperture, single axis, reactionless fast steering mirror.

In a first embodiment, a system includes a base. The system also includes a mirror assembly rotationally coupled to the base and including a mirror. The system further includes a reaction inertia assembly rotationally coupled to the base. In addition, the system includes an actuator configured to drive rotation of the mirror assembly and the reaction inertia assembly. A first end of the mirror is rotationally coupled to the base, and a second end of the mirror is not supported by or attached to another structure.

In a second embodiment, a system includes a base. The system also includes a mirror assembly rotationally coupled to the base and including a mirror. The system further includes a reaction inertia assembly rotationally coupled to the base. The system also includes an actuator configured to drive rotation of the mirror assembly and the reaction inertia assembly. In addition, the system includes multiple flexures configured to support the mirror assembly and the reaction inertia assembly. A first end of the mirror is rotationally coupled to the base, and a second end of the mirror is not supported by or attached to another structure.

In a third embodiment, a method includes rotating a mirror assembly in a first direction using an actuator. The mirror assembly is rotationally coupled to a base and includes a mirror. A first end of the mirror is rotationally coupled to the base, and a second end of the mirror is not supported by or attached to another structure. The method also includes rotating a reaction inertia assembly in a second direction opposite the first direction using the actuator. The reaction inertia assembly is rotationally coupled to the base. The method further include restricting movement of the mirror assembly and the reaction inertia assembly in multiple degrees of freedom using multiple flexures.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, some designs for single axis steering mirrors use a single ball bearing and a cantilever mirror. These designs have high friction and hysteresis and thus provide very limited servo performance. Other designs for flexure-mounted single axis steering mirrors have been proposed that use a flexure on each side of the mirror with one or more mechanisms such as a diaphragm flexure to release over-constrained degrees of freedom. However, the surface figure (wavefront) error performance of these designs has been poor. A typical implementation of a flexure-mounted design involves placing a flexure on each side of a mirror. This is because one characteristic of using flexures is that, in order to obtain sufficiently high stiffness in the other two rotation degrees of freedom in order to prevent rotation, the flexures need to be as far apart as possible. However, this poses a significant surface figure (wavefront) error challenge since the mirror is over-constrained, which can lead to bending of the mirror and poor surface figure (wavefront) error. Some complicated systems of diaphragms and other flexures can be used to release the extra degrees of freedom in an attempt to achieve better wave front error performance, but the results are suboptimal.

This disclosure provides a unique flexure suspension arrangement for a single axis fast steering mirror that provides very high stiffness and mode frequencies while maintaining very low surface figure (wavefront) error. Among other things, the disclosed embodiments address the issue of how to mount a cantilever mirror (for minimal surface figure (wavefront) errors) with a flexure suspension (for excellent servo performance). The disclosed embodiments use multiple flexures rather than bearings due to the flexures' lower friction and hysteresis, which enables substantially better closed loop servo performance. Also, the flexures are spaced far apart while still constraining the mirror at a single location, which provides an advantageous mirror constraint for surface figure (wavefront) error. In addition, the disclosed embodiments incorporate reaction torque compensation, which is generally not implemented on single axis steering mirrors. In some embodiments, the disclosed systems and methods can be used for a number of commercial or defense-related applications. While not specifically listed here, any other suitable applications are within the scope of this disclosure.

Figure 1:
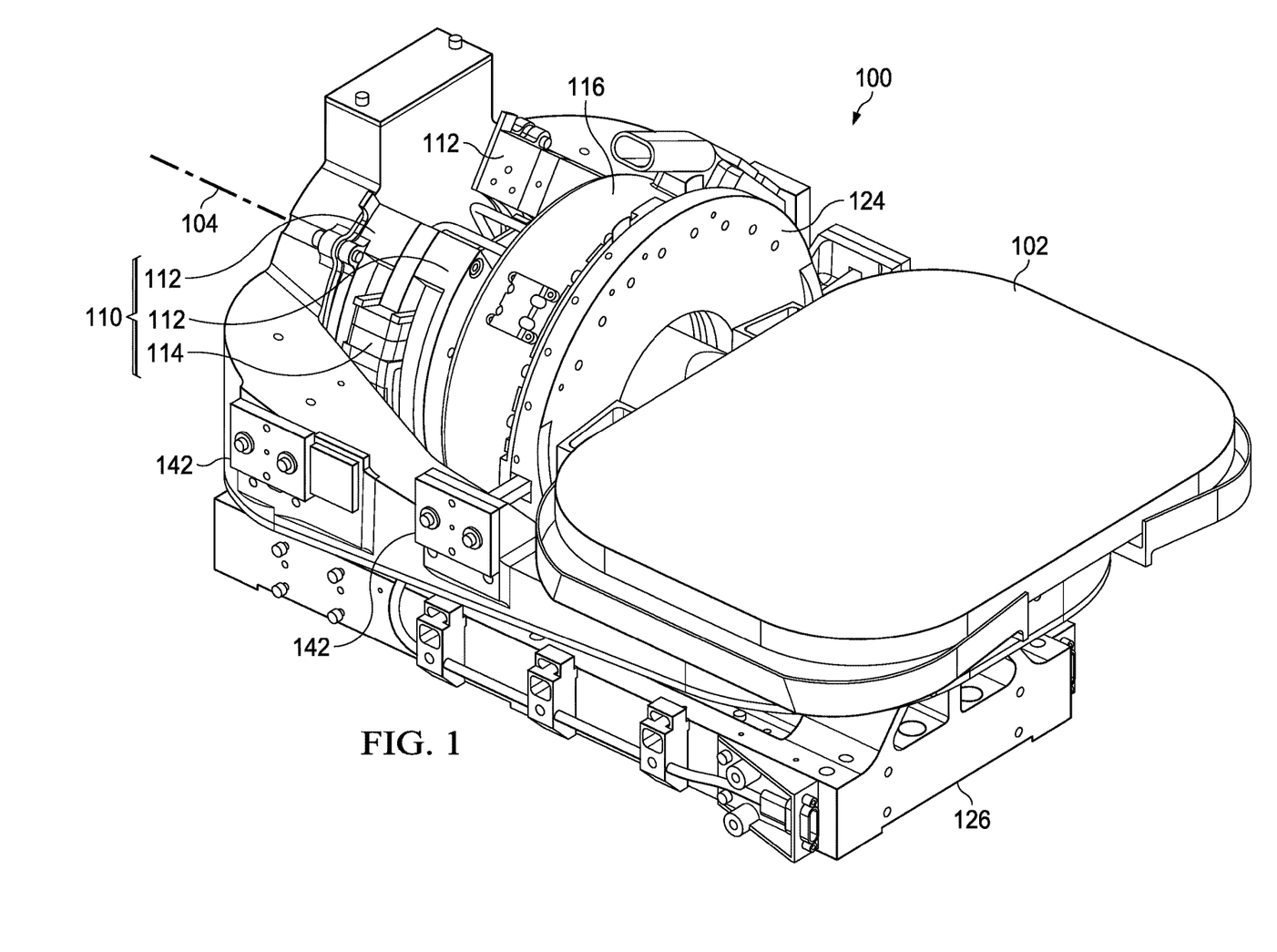
FIGS. 1 through 5 illustrate an example mirror system according to this disclosure.
Figure 2:
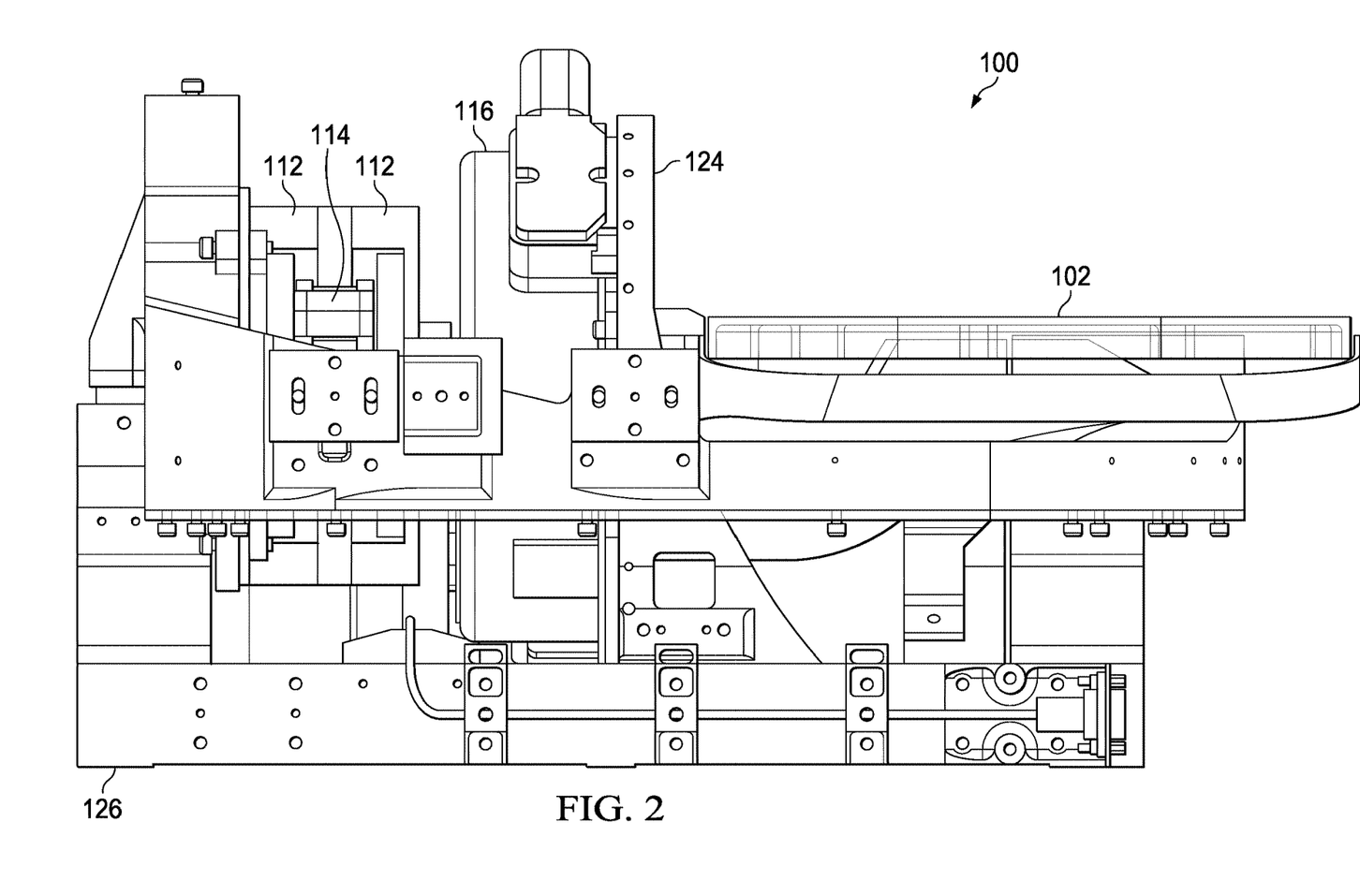
Figure 3:
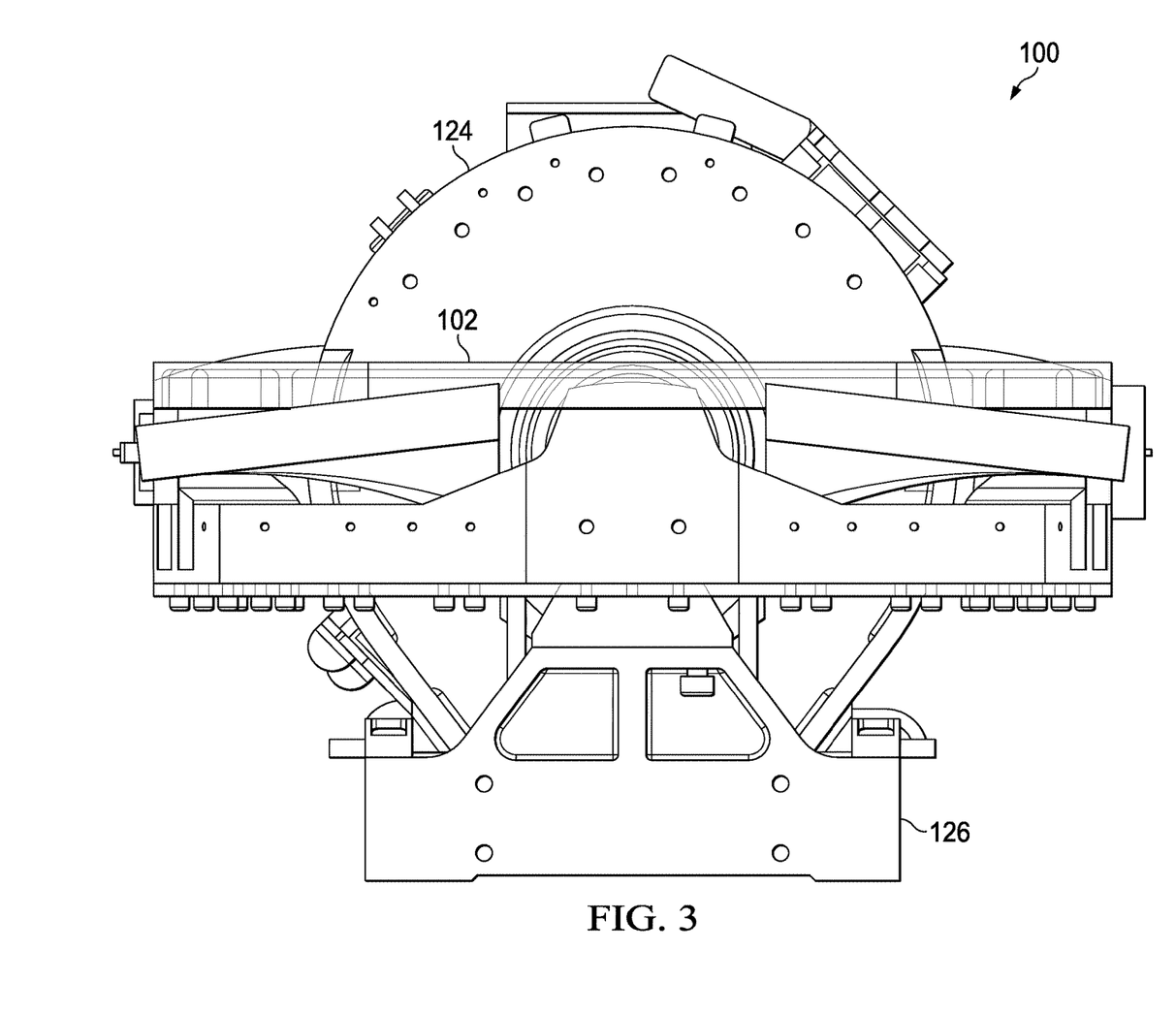
Figure 4:
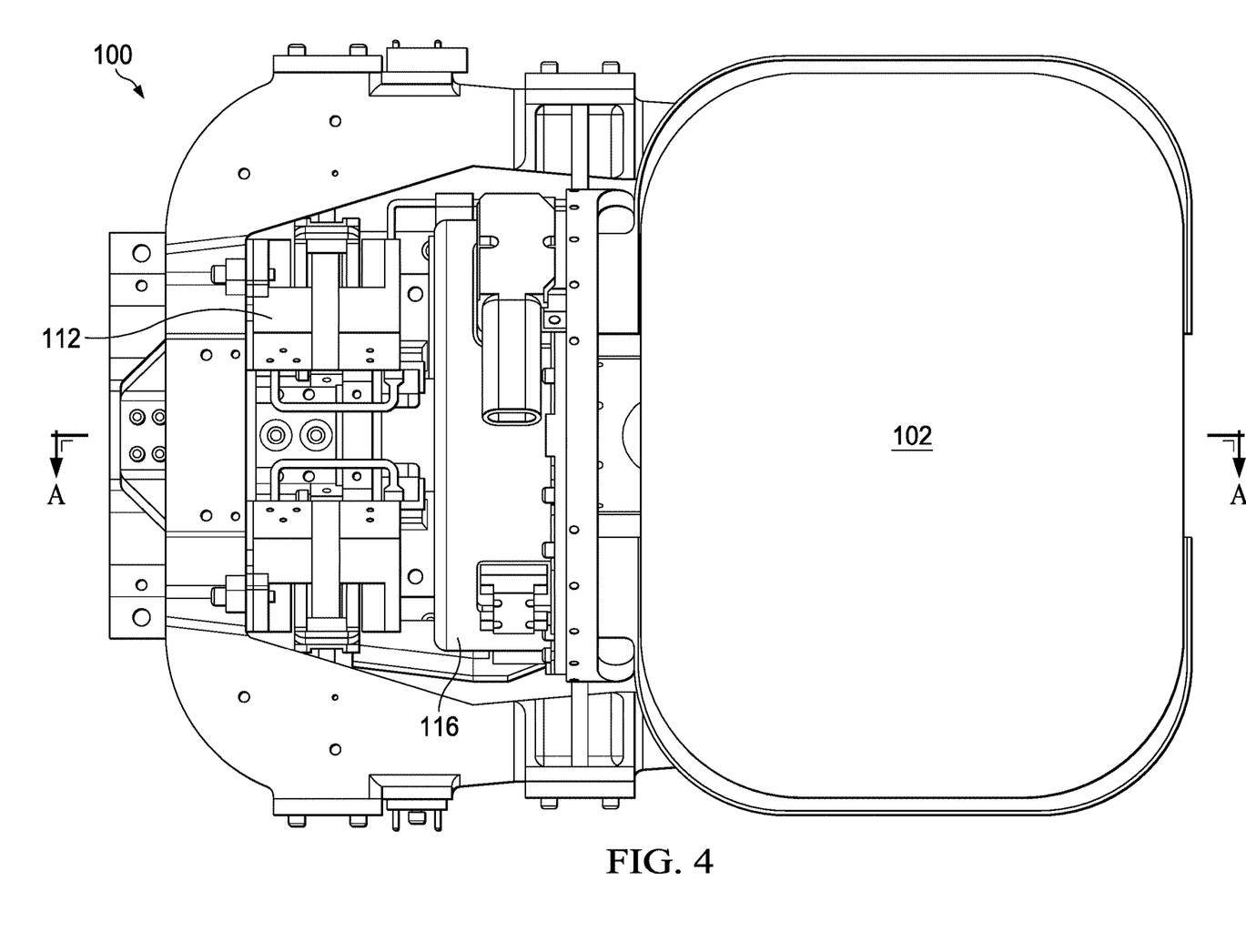
Figure 5:
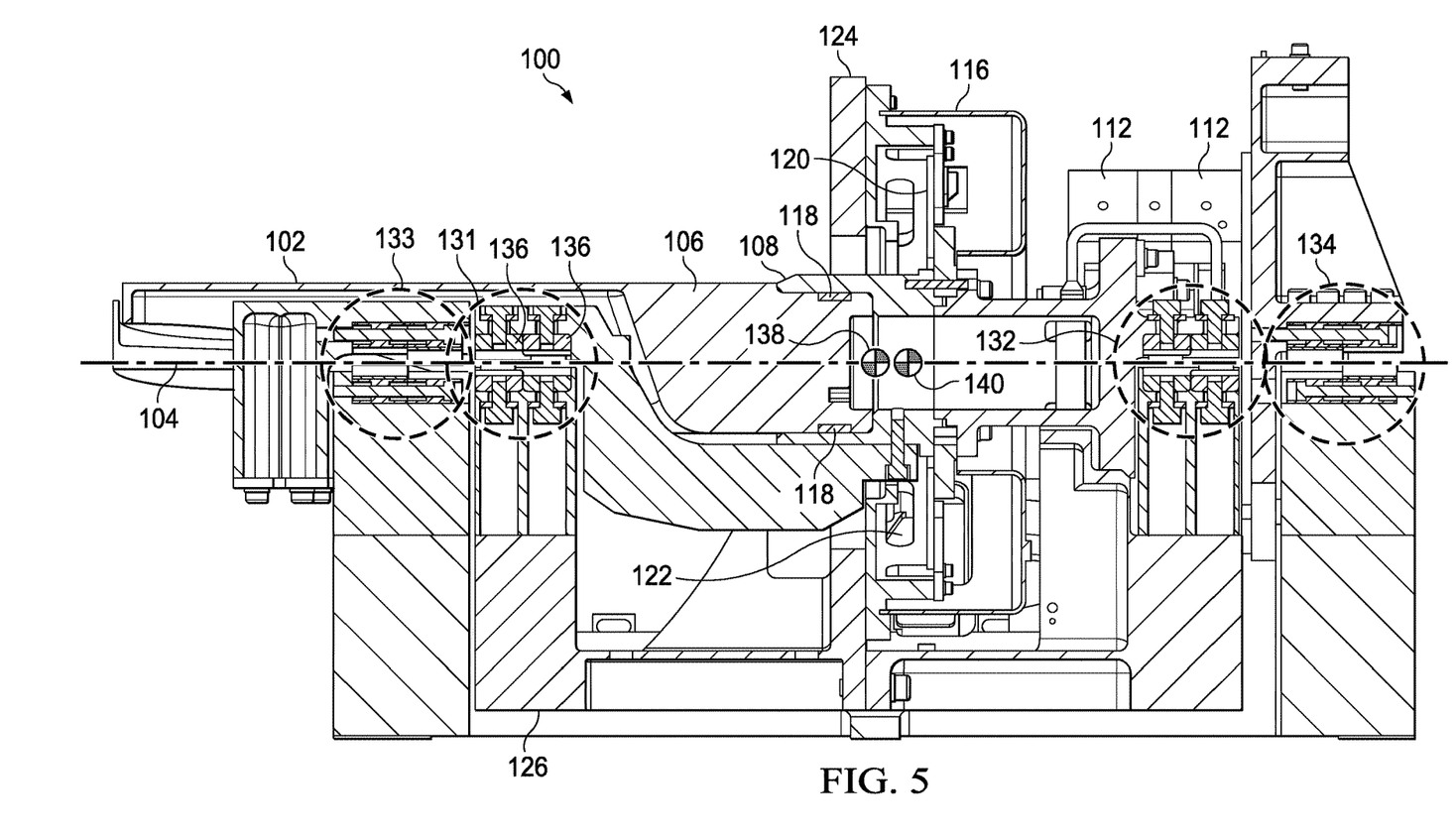

FIGS. 1 through 5 illustrate an example mirror system 100 according to this disclosure. In particular, FIG. 1 shows an isometric view of the mirror system 100, FIG. 2 shows a side view of the mirror system 100, FIG. 3 illustrates an end view of the mirror system 100, FIG. 4 illustrates a top view of the mirror system 100, and FIG. 5 illustrates a cross sectional view of the mirror system 100.

As shown in FIGS. 1 through 5, the mirror system 100 includes a mirror 102. The mirror 102 is a single axis, fast steering mirror that is configured to rotate about a rotation axis 104. In some embodiments, the mirror 102 can oscillate approximately ±5° about the rotation axis 104, although the permissible amount of rotation may be more or less. In some embodiments, the mirror 102 may be substantially planar, although other non-planar shapes may be used for the mirror 102. Also, in some embodiments, the reflective surface of the mirror 102 may be generally rectangular, such as about 9 inches (about 22.86 cm) by about 7 inches (about 17.78 cm). However, this is merely one example, and the reflective surface of the mirror 102 may have any other suitable shape or size. In addition, in some embodiments, the mirror 102 may be formed from beryllium, although the mirror 102 may be formed from any other suitable material or materials.

The mirror 102 is supported at only one end, with the support located on or near the rotation axis 104. As shown in FIG. 5, the support for the mirror 102 includes a post 106 that is inserted into a mirror mounting hub 108. Both the post 106 and the mirror mounting hub 108 may be aligned with the rotation axis 104. In some embodiments, the post 106 is generally cylindrical, and the mirror mounting hub 108 includes a corresponding round opening to receive the post 106. Note, however, that the post 106 and the mirror mounting hub 108 can have any other suitable shapes in cross section, such as a square or polygon. Also, in some embodiments, the mirror 102 is bonded or otherwise attached to the mirror mounting hub 108 at multiple attachment locations 118 around a perimeter of the post 106. In particular embodiments, the post 106 includes eight attachment locations 118, although other embodiments may include a different number of attachment locations 118. Any suitable mechanism can be used to attach the mirror 102 to the mirror mounting hub 108, such as one or more adhesives or welds. The post 106 can have a relatively large size with respect to the size of the mirror 102, such as when the post 106 is approximately one inch in diameter for a 7-inch by 9-inch mirror 102, which provides very high torsional stiffness. That is, the mirror 102 can be driven with a higher level of torque than would be possible if the post 106 were narrower and thus less stiff. This enables extremely high agility and control bandwidth (such as 2000+Hz torsional mode).

Because the outer edge of the mirror 102 (such as the edge of the mirror 102 opposite the post 106) is not directly connected to a support structure, the mirror 102 exhibits extremely low surface figure (wavefront) error since the single mounting location does not over-constrain the mirror 102. Thus, the mirror 102 can have a size and a combination of low surface figure (wavefront) error, agility, and reactionlessness that is not found in conventional mirror assemblies. In addition, because the outer edge of the mirror 102 is not encumbered with space-consuming support structures, the mirror 102 can be placed at the edge of the mirror system 100. Similarly, the mirror system 100 can be disposed near the edge of a surrounding housing or in close proximity to other optical elements for tighter optical packaging. In contrast, conventional mirror systems that have supports or flexures at both ends of the mirror necessarily require additional space at each side of the mirror.

The mirror system 100 also includes a rotary voice coil actuator 110, which drives rotation of the mirror 102. The voice coil actuator 110 includes multiple magnets 112 and windings 114 that operate together to generate a torque, which causes rotational movement of the mirror 102. In some embodiments, the rotary voice coil actuator 110 includes two primary windings 114, two secondary windings 114, and a corresponding number of magnets 112. However, this is merely one example, and other embodiments may include other numbers of magnets 112 and windings 114. In some embodiments, during a movement operation of the mirror 102, the voice coil actuator 110 generates a torque that is applied in one direction to accelerate the mirror 102 and then generates a torque that is applied in the opposite direction to decelerate the mirror 102 to a stop. Multiple stops 142 positioned on opposite sides of the voice coil actuator 110 can prevent over-rotation of the mirror 102 due to malfunction of the control system providing current to the voice coil actuator 110. In some embodiments, the stops 142 are not typically used during normal operation.

The mirror system 100 also includes an optical encoder 116 that is configured to detect a rotational position of the mirror 102 and provide rotational position information that can be used as feedback to control operation of the rotary voice coil actuator 110. In some embodiments, the optical encoder 116 includes an encoder disk 120 with multiple etched lines or other markings disposed circumferentially around a surface of the encoder disk 120. Also, in some embodiments, the encoder disk 120 is formed of glass or another suitable transparent material, although any other suitable material or materials may be used. The encoder disk 120 is structurally coupled to the mirror 102, and the two components rotate together. Other portions of the optical encoder 116, such as at least one encoder read head 122, are mounted to an encoder support structure 124. In some embodiments, the encoder support structure 124 is a structural component, such as a bracket, that may be coupled to or form a portion of a base 126 of the mirror system 100.

During operation, at least one light source generates light through the etched lines of the encoder disk 120 towards at least one encoder read head 122, which may be implemented using a light detector. As rotational movement of the mirror 102 and the encoder disk 120 occurs, consecutive etched lines interrupt the light, which is detected by the encoder read head 122. By counting the interruptions, the encoder read head 122 can determine the number of etched lines that have passed, and thus the amount of movement can be detected. Note, however, that the optical encoder 116 may operate in any other suitable manner. The optical encoder 116 is configured to provide position information at a very high level of precision and accuracy. In some embodiments, the optical encoder 116 can detect and output radial position information on the order of 2-5 microradians. Of course, this description of the optical encoder 116 represents merely one example for providing rotational position information of the mirror 102, and other approaches for providing position feedback are possible.

Figure 6:
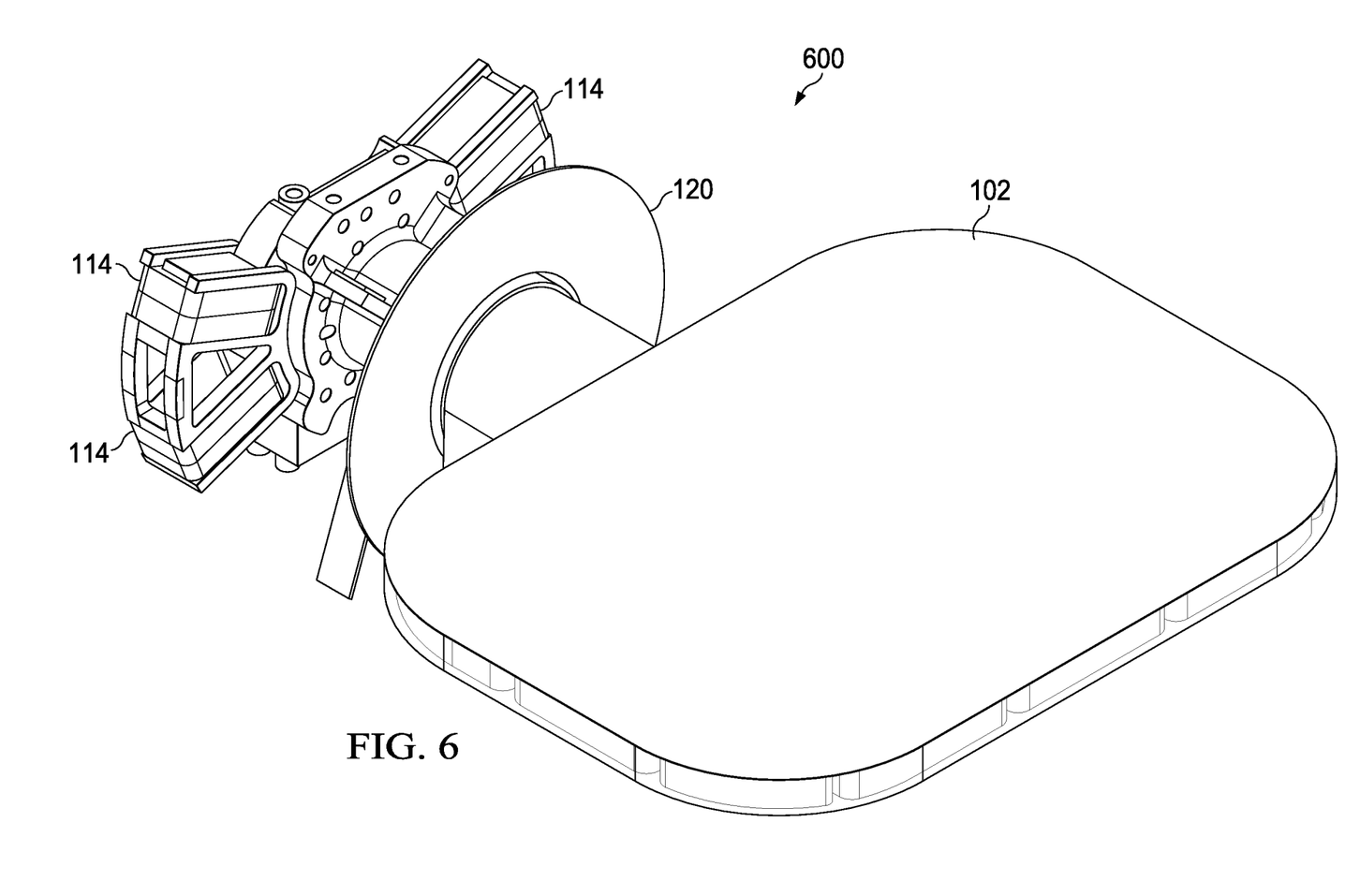
FIG. 6 illustrates an example mirror assembly that may form part of the mirror system of FIGS. 1 through 5 according to this disclosure.

The mirror 102 is part of a mirror assembly that includes multiple components including a portion of the mirror system 100. For example, FIG. 6 illustrates an example mirror assembly 600 that may form part of the mirror system 100 according to this disclosure. As shown in FIG. 6, the mirror assembly 600 includes the mirror 102, the windings 114 of the rotary voice coil actuator 110, and the encoder disk 120. These components are structurally coupled together and rotate together as a single unit about the rotation axis 104.

Figure 7:
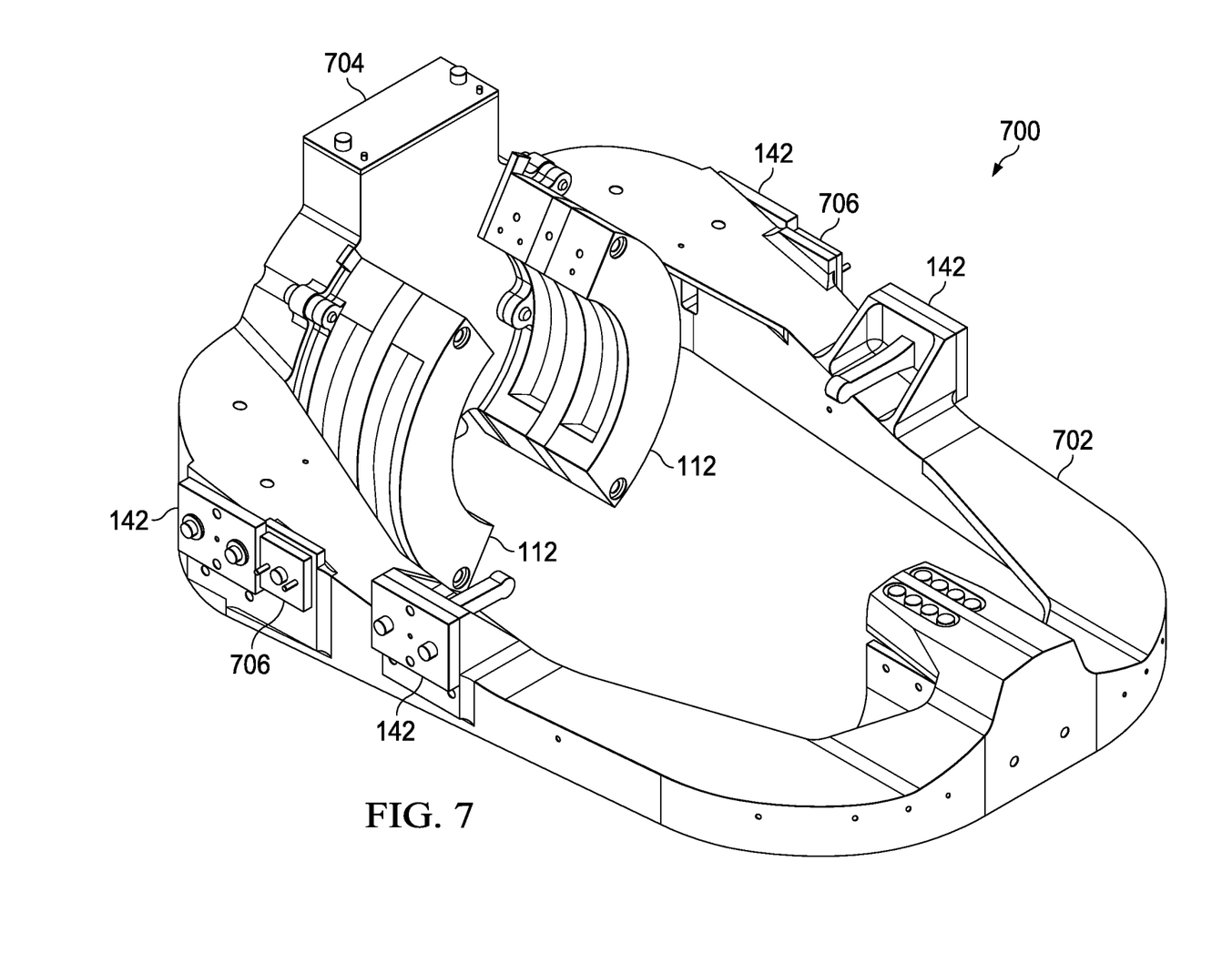
FIG. 7 illustrates an example reaction inertia assembly that may form part of the mirror system of FIGS. 1 through 5 according to this disclosure.

Rotation of the mirror assembly 600 results in an amount of rotational inertia that, if not countered, may cause a disturbance in one or more components external to the mirror system 100. To counter the rotational inertia of the mirror assembly 600, the mirror system 100 includes a reaction inertia assembly 700. For example, FIG. 7 illustrates an example reaction inertia assembly 700 that may form part of the mirror system 100 according to this disclosure. As shown in FIG. 7, the reaction inertia assembly 700 includes the magnets 112 of the rotary voice coil actuator 110, an assembly frame 702, at least one center-of-gravity (CG) counterweight 704, frequency match counterweights 706, and the stops 142.

The assembly frame 702 provides a structural component to which other portions of the reaction inertia assembly 700 can be attached. The assembly frame 702 may also provide most of the mass of the reaction inertia assembly 700. The CG counterweight 704 is a relatively small mass (compared to the mass of the assembly frame 702) that can be selected to result in a suitable location for the center of gravity of the reaction inertia assembly 700. The frequency match counterweights 706 are attached on opposite sides of the assembly frame 702 and provide a relatively small mass (compared to the mass of the assembly frame 702) that can be selected to optimize the inertia generated by the reaction inertia assembly 700 based on the frequency of movement. In some implementations, the counterweights 704 and 706 may be included as part of one of the other components, or may be omitted entirely.

The mirror assembly 600 and the reaction inertia assembly 700 both rotate about the same rotation axis 104 but in opposite directions so that the torque applied to the mirror assembly 600 is substantially or completely countered by the torque applied to the reaction inertia assembly 700. Placing the mirror assembly 600 and the reaction inertia assembly 700 on the same axis means that the assemblies 600 and 700 generate a true couple (moment) for all rotations. Thus, little or no forces or torques are exported from the mirror system 100 to the surrounding optics. This balance of movement also allows for the use of the rotary voice coil actuator 110, which is a highly-efficient type of motor. This is in contrast to using one or more linear voice coil actuators, which are less efficient and cannot be a true couple to both assemblies 600 and 700. For example, in some embodiments, the average power consumption of the rotary voice coil actuator 110 is approximately 0.1 watts to drive a nine-inch mirror 102 with 100% duty cycle in a step/stair pattern (such as ⅓ step duration, ⅔ stair duration) and approximately 200 radians/s$^2$ maximum acceleration. Because only a small amount of power is used by the rotary voice coil actuator 110 and little waste heat is generated, there is minimal or no likelihood of thermal distortion to the reflective surface of the mirror 102.

Due to the larger mass and wider radial distribution of mass of the reaction inertia assembly 700 compared to the mirror assembly 600, the overall inertia of the reaction inertia assembly 700 is greater for a given rotation speed than the mirror assembly 600. Therefore, the reaction inertia assembly 700 rotates slower and travels a shorter rotational distance than the mirror assembly 600. For example, in some embodiments, the inertia ratio of the reaction inertia assembly 700 to the mirror assembly 600 is approximately 8:1, although different values are possible depending on the embodiment. In such a case, the ratio of rotational acceleration, speed, and angle traveled for the reaction inertia assembly 700 relative to the mirror assembly 600 is approximately 1:8.

Rather than using bearings to support the mirror assembly 600 and the reaction inertia assembly 700, the mirror system 100 includes multiple flexures 131-134 as shown in FIG. 5. The flexures 131-134 exhibit lower friction and hysteresis compared to bearings with similar support capabilities, which allows substantially better closed loop servo performance, precise pointing, and agility during rotation operation of the mirror 102. The flexures 131-134 include two mirror flexures 131-132 and two reaction inertia flexures 133-134.

Figure 8:
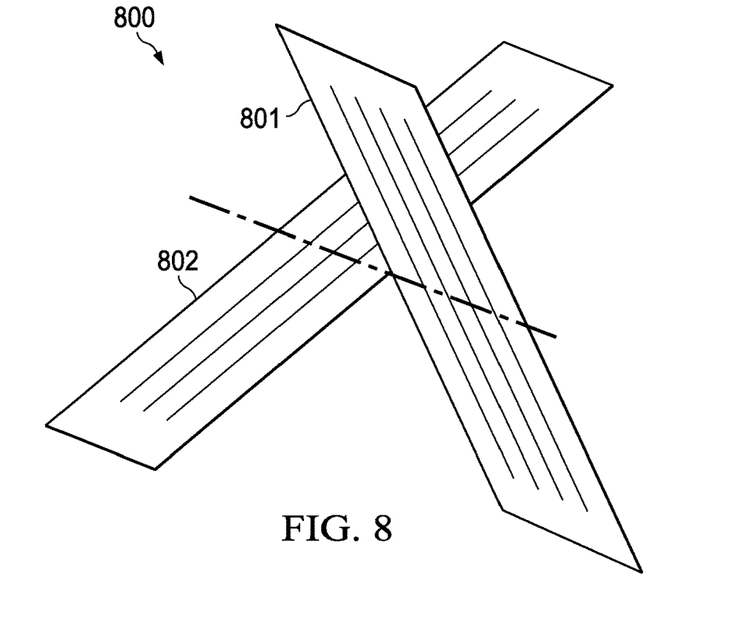
FIG. 8 illustrates an example flexure for use in a mirror system according to this disclosure.

In this example embodiment, each flexure 131-134 includes two substantially flat blades 136 formed of metal or other suitable material(s). The blades 136 are arranged in a skew configuration. That is, the blades 136 are offset from each other and are oriented at different angles such that the two blades 136 appear to cross when viewed along their edges. FIG. 8 illustrates an example flexure 800 for use in a mirror system according to this disclosure. The flexure 800 includes two blades 801 and 802 that are arranged in a skew configuration. The arrangement of the blades 801 and 802 in the flexure 800 may generally represent the arrangement of the blades 136 in each of the flexures 131-134. In FIG. 5, the blades 136 are oriented at approximately ±45° relative to the plane of the drawing page and, if viewed from the end of the mirror system (such as in FIG. 3), the blades 136 would appear to intersect at the rotation axis 104. Note, however, that other angles for the blades 136 may be used. The arrangement of the blades 136 in each flexure 131-134 and the arrangement of the flexures 136 on opposite sides of the assemblies allow relative freedom of rotational movement about the rotation axis (one degree of freedom) while providing stiffness and restricting rotational and translational movement in other directions (the other five degrees of freedom). The design of the flexures 131-134 provides a very long lifespan with little or no contact wear or lubrication requirements.

As shown in FIG. 5, the mirror flexures 131-132 are substantially in line with the rotation axis 104 and are positioned on opposite sides of the center of gravity 138 of the mirror assembly 600. In some embodiments, the mirror flexures 131-132 are positioned approximately equidistant from the center of gravity 138. Since the center of gravity 138 is at or near the rotation center in all three axes, linear external disturbances do not cause the supported mass of the mirror assembly 600 to rotate (and vice versa). The mirror flexures 131-132 are spaced relatively far apart within the mirror system 100 while still constraining the mirror 102 at only one end near the post 106, which provides an advantageous mirror constraint for minimal surface figure (wavefront) error. The proximity of the mirror flexures 131-132 to the rotation axis 104 provides a low supported first mode (low flexure stiffness of the rotation degree of freedom about the rotation axis 104) for the supported mirror assembly 600, while the distance between the mirror flexures 131-132 provides very high second through sixth modes for the mirror assembly 600.

Similarly, the reaction inertia flexures 133-134 are substantially in line with the rotation axis 104 and are positioned on opposite sides of the center of gravity 140 of the reaction inertia assembly 700. In some embodiments, the reaction inertia flexures 133-134 are positioned approximately equidistant from the center of gravity 140. Since the center of gravity 140 is at the rotation center in all three axes, linear external disturbances do not cause the supported mass of the reaction inertia assembly 700 to rotate (and vice versa). The reaction inertia flexures 133-134 are spaced relatively far apart within the mirror system 100. This arrangement enables suitable reaction torque compensation, which is generally not implemented on conventional single axis steering mirrors. The proximity of the reaction inertia flexures 133-134 to the rotation axis 104 provides a low supported first mode for the supported reaction inertia assembly 700, while the distance between the reaction inertia flexures 133-134 provides very high second through sixth modes for the reaction inertia assembly 700.

Although FIGS. 1 through 8 illustrate one example of a mirror system 100 and related details, various changes may be made to FIGS. 1 through 8. For example, the mirror system 100 and its individual components may have any suitable sizes, shapes, and dimensions. Also, various components in the mirror system 100 may be combined, further subdivided, replicated, rearranged, or omitted and additional components may be added according to particular needs. As a particular example, the mirror system 100 may include a position feedback system separate from the optical encoder 116. As another particular example, the magnets 112 and windings 114 of the rotary voice coil actuator 110 may be reversed so that the mirror assembly 600 includes the magnets 112 and the reaction inertia assembly 700 includes the windings 114. In addition, depending on the design of the mirror assembly 600 and the reaction inertia assembly 700, the centers of gravity 138 and 140 may be located at other points in the mirror system 100.

Figure 9:
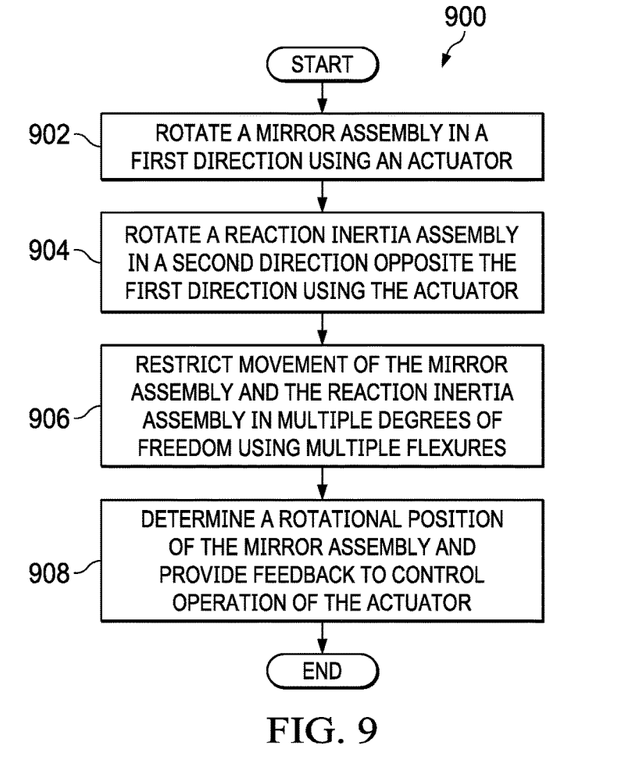
FIG. 9 illustrates an example method for operating a mirror system according to this disclosure.

FIG. 9 illustrates an example method 900 for operating a mirror system according to this disclosure. For ease of explanation, the method 900 is described as being performed using the mirror system 100 of FIGS. 1 through 8. However, the method 900 may be used with any other suitable device or system.

As shown in FIG. 9, a mirror assembly is rotated in a first direction using an actuator at step 902. This may include, for example, the voice coil actuator 110 rotating the mirror assembly 600, including the mirror 102, in a first direction around the rotation axis 104. The mirror assembly 600 may be rotationally coupled to a base 126 and include a mirror 102. A first end of the mirror 102 may be rotationally coupled to the base 126, and a second end of the mirror 102 may not be supported by or attached to another structure. A reaction inertia assembly is rotated in a second direction opposite the first direction using the actuator at step 904. This may include, for example, the voice coil actuator 110 rotating the reaction inertia assembly 700 in the opposite direction around the rotation axis 104. The reaction inertia assembly 700 may be rotationally coupled to the base 126.

Movement of the mirror assembly and the reaction inertia assembly is restricted in multiple degrees of freedom using multiple flexures at step 906. This may include, for example, the mirror flexures 131-132 providing a low supported first mode (low flexure stiffness of the rotation degree of freedom about the rotation axis 104) for the supported mirror assembly 600 while providing very high second through sixth modes for the mirror assembly 600. This may also include, for example, the flexures 133-134 providing a low supported first mode for the supported reaction inertia assembly 700 while providing very high second through sixth modes for the reaction inertia assembly 700.

A rotational position of the mirror assembly is determined using an optical encoder and rotational position information is provided as feedback to control operation of the actuator at step 908. This may include, for example, the optical encoder 116 determining a rotational position of the mirror assembly 600 and providing rotational position information as feedback to control operation of the voice coil actuator 110. This control may allow, for instance, an external controller or control system to control operation of the voice coil actuator 110 in order to generate a torque that accelerates the mirror 102 and then generate a torque that decelerates the mirror 102 to a stop.

Although FIG. 9 illustrates one example of a method 900 for operating a mirror system, various changes may be made to FIG. 9. For example, while shown as a series of steps, various steps shown in FIG. 9 may overlap, occur in parallel, occur in a different order, or occur multiple times. Also, some steps may be combined or removed and additional steps may be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a base;
a mirror assembly rotationally coupled to the base and comprising a mirror, the mirror assembly configured to rotate around only a single rotation axis;
a reaction inertia assembly rotationally coupled to the base, the reaction inertia assembly configured to rotate around only the single rotation axis; and
an actuator configured to drive rotation of the mirror assembly and the reaction inertia assembly;
wherein a first end of the mirror is rotationally coupled to the base and a second end of the mirror is not supported by or attached to another structure; and
wherein the mirror assembly includes first and second flexures disposed on opposite sides of a center of gravity of the mirror assembly and configured to support the mirror assembly, the first and second flexures disposed along the single rotation axis.

2. The system of claim 1, wherein the mirror assembly and the reaction inertia assembly are configured to rotate in opposite directions around the single rotation axis.

3. The system of claim 2, wherein:
the first end of the mirror comprises a post coupled to a mirror mounting hub; and
the post and the mirror mounting hub are aligned with the single rotation axis.

4. The system of claim 1, wherein the reaction inertia assembly includes third and fourth flexures disposed on opposite sides of a center of gravity of the reaction inertia assembly, the third and fourth flexures disposed along the single rotation axis.

5. The system of claim 4, wherein at least one of the flexures comprises multiple blades arranged in a skew configuration.

6. The system of claim 1, wherein:
the actuator comprises multiple windings and magnets;
the windings of the actuator are mounted to one of the mirror assembly or the reaction inertia assembly; and
the magnets are mounted to the other of the mirror assembly or the reaction inertia assembly.

7. The system of claim 1, further comprising:
an optical encoder configured to determine a rotational position of the mirror assembly and provide rotational position information as feedback to control operation of the actuator.

8. A system comprising:
a base;
a mirror assembly rotationally coupled to the base and comprising a mirror, the mirror assembly configured to rotate around only a single rotation axis;
a reaction inertia assembly rotationally coupled to the base, the reaction inertia assembly configured to rotate around only the single rotation axis;
an actuator configured to drive rotation of the mirror assembly and the reaction inertia assembly; and
multiple flexures configured to support the mirror assembly and the reaction inertia assembly;
wherein a first end of the mirror is rotationally coupled to the base and a second end of the mirror is not supported by or attached to another structure; and
wherein the flexures comprise first and second mirror flexures disposed on opposite sides of a center of gravity of the mirror assembly and configured to support the mirror assembly, the first and second mirror flexures disposed along the single rotation axis.

9. The system of claim 8, wherein the mirror assembly and the reaction inertia assembly are configured to rotate in opposite directions around the single rotation axis.

10. The system of claim 9, wherein:
the first end of the mirror comprises a post coupled to a mirror mounting hub; and
the post and the mirror mounting hub are aligned with the single rotation axis.

11. The system of claim 8, wherein the flexures further comprise first and second reaction inertia flexures configured to support the reaction inertia assembly and disposed on opposite sides of a center of gravity of the reaction inertia assembly, the first and second reaction inertia flexures disposed along the single rotation axis.

12. The system of claim 11, wherein at least one of the flexures comprises multiple blades arranged in a skew configuration.

13. The system of claim 8, wherein:
the actuator comprises multiple windings and magnets;
the windings of the actuator are mounted to one of the mirror assembly or the reaction inertia assembly; and
the magnets are mounted to the other of the mirror assembly or the reaction inertia assembly.

14. The system of claim 8, further comprising:
an optical encoder configured to determine a rotational position of the mirror assembly and provide rotational position information as feedback to control operation of the actuator.

15. A method comprising:
rotating a mirror assembly around only a single rotation axis in a first direction using an actuator, the mirror assembly rotationally coupled to a base and comprising a mirror, wherein a first end of the mirror is rotationally coupled to the base and a second end of the mirror is not supported by or attached to another structure;
rotating a reaction inertia assembly around only the single rotation axis in a second direction opposite the first direction using the actuator, the reaction inertia assembly rotationally coupled to the base; and
restricting movement of the mirror assembly and the reaction inertia assembly in multiple degrees of freedom using multiple flexures;
wherein the flexures comprise first and second mirror flexures disposed on opposite sides of a center of gravity of the mirror assembly and configured to support the mirror assembly, the first and second mirror flexures disposed along the single rotation axis.

16. The method of claim 15, further comprising:
determining a rotational position of the mirror assembly using an optical encoder; and
providing rotational position information as feedback to control operation of the actuator.

17. The method of claim 15, wherein at least one of the flexures comprises multiple blades arranged in a skew configuration.

18. The method of claim 15, wherein the flexures further comprise first and second reaction inertia flexures configured to support the reaction inertia assembly and disposed on opposite sides of a center of gravity of the reaction inertia assembly, the first and second reaction inertia flexures disposed along the single rotation axis.

19. The system of claim 6, wherein the actuator comprises a voice coil actuator.

20. The system of claim 13, wherein the actuator comprises a voice coil actuator.

* * * * *